Sept. 24, 1957 J. G. KENNARD 2,807,209
FUEL PRESSURIZATION SYSTEM
Filed May 20, 1952
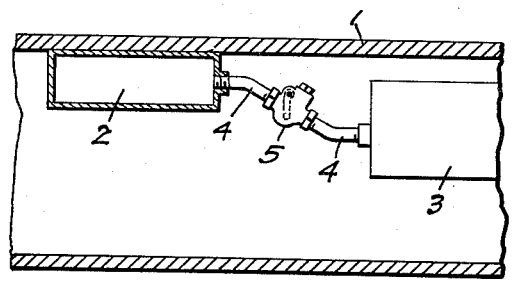
Inventor
Jarman G. Kennard
By G. J. Kessenich, A. W. Dew
and P. M. Craig, Jr.
Attorneys

United States Patent Office 2,807,209
Patented Sept. 24, 1957

2,807,209
FUEL PRESSURIZATION SYSTEM

Jarman G. Kennard, Schenectady, N. Y., assignor to the United States of America as represented by the Secretary of the Army Application May 20, 1952, Serial No. 288,906

1 Claim. (Cl. 102—49)

The present invention relates to a novel and improved fuel pressurization system.

More particularly the present invention relates to a novel and improved fuel pressurization system for use with high velocity vehicles or missiles which utilizes aerodynamic heating through friction to maintain sufficient pressure to bring the fuel to the combustion chamber.

It is accordingly an object of the present invention to provide a simple fuel pressurization system which does not necessitate an external pump or pressurizing device to bring the fuel to the combustion chamber.

It is another object of the present invention to provide an improved fuel pressurization system which utilizes aerodynamic heating.

A still further object of the present invention is to provide a fuel pressurization system for use with high speed vehicles or missiles, such as guided missiles, which is simple in design and extremely modest in space requirements.

Another object of the present invention is to provide a fuel pressurization system for use with high speed missiles which obviates the necessity for separate pressurization equipment thereby relieving additional space and weight for extra fuel and thus extending the range of the missile or increasing the useful pay load.

A further object of the present invention is to provide a fuel pressurization system which utilizes the heat developed by aerodynamic friction during high speed travel of the missile to maintain sufficient pressure to force the fuel into the combustion chamber at all times.

The specific nature of the invention as well as other objects and advantages thereof will be obvious from the following description taken in connection with the accompanying drawing which shows for purposes of illustration only one specific embodiment of this invention, and wherein:

The single figure illustrates schematically the fuel pressurization in accordance with the present invention.

Guided missiles using a centrifugal pump to bring the fuel to the combustion chamber require some means of maintaining enough positive pressure on the pump inlet to prevent cavitation. This may be done, for example, by using ram air, as on the German V-2, or with gas bottles, a regulating valve and a starting valve, or any other similar system.

On high Mach number missiles that must remain in the earth's atmosphere, such as ramjet missiles that require air for combustion, ram air cannot be used. Ram air slowed down by a scoop at Mach 4 would be in the order of 1200 degrees F. At this temperature it could not be permitted to come in contact with the fuel.

However a system involving gas bottles and accompanying valving is bulky, expensive and not always reliable.

It is known that at flight velocities of high Mach numbers in the atmosphere, the missile skin will become very hot due to friction giving rise to aerodynamic heating. I have discovered that this phenomena of aerodynamic heating may be used advantageously in accordance with the present invention by sealing a section of the missile at atmospheric pressure at sea level and by connecting this section to the fuel tank through an open line. In order to prevent the fuel from draining into the pressurizing tank a check valve may be used. During free flight the skin of the missile is heated aerodynamically and thus will act as a heat exchanger, and, in accordance with Boyle's law, will expand the pressurizing gas, thereby pressurizing the fuel. This is in addition to the pressurization gained by sealing sea level pressure and taking it to the altitude at which a ramjet missile will probably fly. This alone would amount to at least 12 pounds per square inch.

Referring now more particularly to the single drawing, which illustrates schematically a specific embodiment of my invention, reference numeral 1 designates a portion of the shell or skin of the missile. A pressurizing tank or section 2, which may be of any shape or size so as to utilize most effectively the available space within the missile 1, contains a gas sealed in tank 2 at atmospheric pressure at sea level. Tank 2 is connected to fuel tank 3 by means of an open line 4. A check valve 5 may be used to prevent fuel in tank 3 from draining into tank 2.

While I have shown one specific embodiment of my invention, it is understood that it is only for purposes of illustration, and, therefore, not to be construed as limitation of my invention which is subject to various modification as is well known to any one skilled in the art. For example, tanks 2 and 3 may be of any shape or size, and may be relocated within the missile wherever space is most conveniently available. In order to get appropriate heat transfer between skin 1 of the missile and tank 2, tank 2 may be placed directly against skin 1 or may be brought in contact therewith through any heat transferring media or materials. Moreover the gas in tank 2, described herein as air, may be any other gas which will not react when in contact with the fuel of fuel tank 3.

From the foregoing description, it is obvious that the fuel pressurization system in accordance with the present invention will permit the missile to carry more fuel or a greater pay load by eliminating the extra weight and space required for gas bottles and regulating and starting valves.

I claim:

A high speed free flight missile having a heat conducting outer skin, a pressurizing tank formed of a heat conducting material and containing only air therein, a fuel tank mounted within said missile distant from said skin and said pressurizing tank, said pressurizing tank mounted within said missile in direct contact with said skin so that the heat developed on said skin by aerodynamic friction will be transferred to said pressurizing tank to pressurize said air and said pressurizing tank being connected only to said fuel tank for directing the pressurized air to said fuel tank.

References Cited in the file of this patent

UNITED STATES PATENTS

| 250,144 | Haight | Nov. 29, 1881 |
| 2,408,111 | Truax et al. | Sept. 24, 1946 |

FOREIGN PATENTS

| 590,177 | Great Britain | July 10, 1947 |
| 992,847 | France | July 11, 1951 |